United States Patent [19]

Bourke

[11] 4,357,005

[45] Nov. 2, 1982

[54] SUPPORT FOR SEAT PAD
[75] Inventor: Robert P. Bourke, Kitchener, Canada
[73] Assignee: Lear Siegler, Inc., Livonia, Mich.
[21] Appl. No.: 214,062
[22] Filed: Dec. 8, 1980
[51] Int. Cl.[3] .............................................. A47C 7/30
[52] U.S. Cl. .................................. 267/144; 267/142; 5/309
[58] Field of Search ................. 267/142, 144, 90, 107, 267/110, 111; 5/309

[56] References Cited

U.S. PATENT DOCUMENTS

| 969,963 | 9/1910 | Laa | 267/111 |
|---|---|---|---|
| 2,637,046 | 5/1953 | Neely | 5/309 |
| 3,165,308 | 1/1965 | Rathbun | 267/111 |
| 3,353,869 | 11/1967 | Getz et al. | 267/111 |
| 3,876,144 | 4/1975 | Grosseav | 267/110 |

Primary Examiner—Trygve M. Blix
Assistant Examiner—C. T. Bartz
Attorney, Agent, or Firm—Reising, Ethington, Barnard, Perry & Brooks

[57] ABSTRACT

A seat pad support (12) disclosed includes at least one strip (22,24) of generally flexible tape which is preferably of the pressure sensitive type extending laterally between elongated supports preferably embodied by wire torsion bar springs (16) that cooperatively support a foam pad on a seat frame (14), whereby the tape connection of the springs facilitates storage, handling, and assembly. In the preferred construction, two end strips (22,24) of the tape respectively connect end torsion bars (28,30) of the springs (16). Each end tape strip (22,24) is folded and bonded to itself and preferably includes recesses (46) associated with the torsion bars (28,30) connected thereby so as to facilitate connection of the springs to the frame. The pad support (12) has particular utility for supporting a foam cushion pad (52) and its springs (16) incorporate forward and rearward intermediate torsion bars (32',32'') respectively positioned above and below the tape connected front and rear end torsion bars (28,30) to provide support for the cushion pad (52) at an upwardly extending front pad recess (56) and a downwardly extending rear pad projection (58). In an alternate embodiment, two intermediate tape springs (39) connect central intermediate torsion bars (32) of the springs (16).

5 Claims, 6 Drawing Figures

SUPPORT FOR SEAT PAD

TECHNICAL FIELD

This invention relates to a support for seat pads and has particular utility when used with foam seat pads of vehicle seats.

BACKGROUND ART

Approximately ten years ago, United States vehicle manufacturers began using all foam seat pads to replace the cloth pads, burlap, and cloth ticking, etc. previously utilized. Introduction of the foam seat pads provided cost reduction, reduced the number of components that had to be inventoried, and facilitated assembly of the seats. Conventionally, such foam seat pads have been mounted on a frame pan stamped from sheet metal with the required shape for supporting the pad. Such sheet metal pans are continuous over the extent of the foam pads and despite the relatively thin thickness thereof have considerable weight when taking into account the total number of seats in each vehicle. Of course, with the ever-increasing scarcity of available fossil fuels for powering conventional vehicle engines, weight reduction of vehicles is highly desirable.

Torsion bar type wire springs have previously been considered for supporting foam seat pads so as to, among other things, reduce the weight of the seat in comparison to those incorporating the stamped pans. These springs are either of the "sinuous" type wherein torsion bars thereof are connected by curved connecting loops that open in opposite directions or are of the "formed wire" type wherein the ends of the torsion bars are connected by abrupt bends to straight connecting portions so as to define either U or Z shapes. However, such springs have to be individually handled for assembly and can become entangled with each other prior to assembly so as to present a manufacturing problem. Also, if the ends of such springs are to be directly connected to an associated metal seat frame, noise problems can result from the metal-to-metal contact between the springs and the frame. To overcome these problems, consideration has previously been given to connecting the ends of torsion bar springs to paper or plastic covered wires which extend transversely between the springs and are in turn connected to the seat frame. However, such transverse wires limit the independent resilient action of the individual springs. Additionally, the extra weight of the transverse wires as well as the necessity of connecting each spring end thereto as well as connecting the transverse wires to the frame resulted in too many undesirable features to make a commercially feasible product.

Furthermore, consideration has also been given to interconnecting closely spaced wires by paper or plastic covered wire to essentially form a wire mat for supporting a foam seat pad. However, such a construction does not provide the proper feel to a seated occupant and thus has never become a commercial product.

DISCLOSURE OF INVENTION

An object of the present invention is to provide an improved seat pad support having a construction that facilitates storage, handling, and assembly of the support to an associated seat frame.

In carrying out the object, a seat pad support constructed in accordance with the present invention includes at least one strip of generally flexible tape extending laterally between elongated support members on which the pad is mounted such that the tape provides a connection between the support members in order to facilitate the storage, handling, and assembly of the support to the seat frame. Each of the elongated support members is fabricated from a rigid material and has opposite ends adapted to be respectively connected to spaced portions of the seat frame so as to extend therebetween in a spaced relationship to each other in order to cooperatively permit the mounting of the seat pad on the frame.

In the preferred construction, the support members comprise torsion bar springs including torsion bars with opposite ends and including connecting portions extending between the ends of the torsion bars. These torsion bar springs are most preferably of the "formed wire" type with abrupt bends connecting the ends of the torsion bars with the connecting portions which have straight configurations such that the springs have U and/or Z shapes. Each spring has a pair of end torsion bars adapted to be respectively connected to the spaced portions of the seat frame which is disclosed as being of the conventional metal type, and each spring also has at least one intermediate torsion bar located between the end torsion bars.

Preferably, the generally flexible tape utilized is of the pressure sensitive type. Two strips of the generally flexible tape are each folded to connect associated sets of end torsion bars of the springs. A recess at each end torsion bar is provided in each folded strip of tape by a pair of cuts so as to facilitate connected of the end torsion bars to the seat frame.

In an alternate embodiment, two intermediate strips of tape connect intermediate torsion bars of the springs and are bonded to each other from opposite sides of the springs in a spaced relationship to the end torsion bars. Such intermediate tape strips can be utilized alone or in cooperation with the folded strips that connect the end torsion bars.

Prior to assembly to the seat frame, the torsion bar springs connected by the strips of tape can be stored with the tape strips folded such that the springs are arranged in a stacked relationship or with the support laid out in its use shape such that the tape strips extend between the springs in a generally straight condition. In either case, the endmost springs can be conveniently grasped to position the support in alignment with an associated seat frame for connection to spaced frame portions. Of course, the tape strips are unfolded upon such assembly if stored in the folded condition but remain straight if stored in the straight condition. With the end torsion bars of the springs connected to the spaced metal portions of the seat frame, the strips of tape connecting the end torsion bars are interposed between the metal frame and the metal springs and thereby mitigate noise upon loading of a seat pad supported by the springs.

Also, as disclosed, the tape connected torsion bar springs are designed for use with a foam seat cushion pad and have forward and rearward intermediate torsion bars respectively positioned above and below the adjacent front and rear end torsion bars connected to the spaced seat frame portions. As such, a foam cushion pad supported by the tape connected torsion bar springs of the support can have a greater thickness in the rear buttock support area and a thinner thickness in the front thigh support area so that the pad thickness corresponds to the seating load normally applied in each of these areas. A lower surface of the pad has an upwardly extending front recess and a downwardly extending rear projection respectively supported by the springs adjacent the forward and rearward intermediate torsion bars.

The above object and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
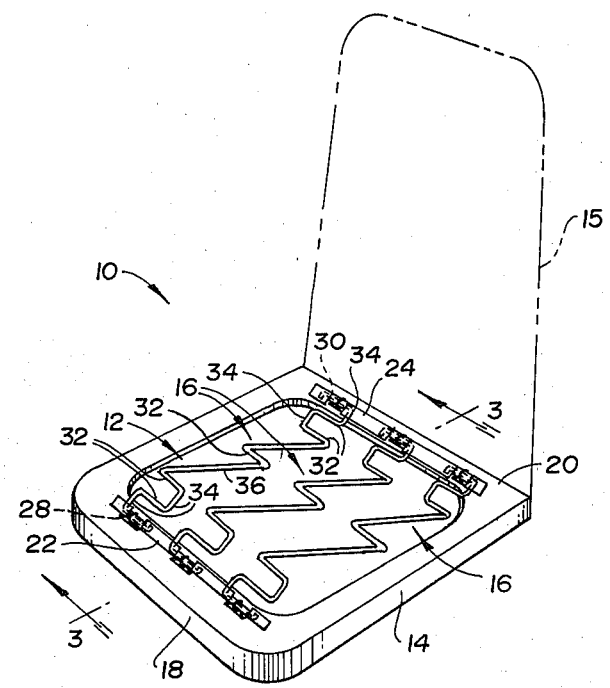
FIG. 1 is a perspective view of a vehicle seat incorporating a seat pad support constructed in accordance with the present invention.

Referring to FIG. 1 of the drawings, a vehicle seat indicated collectively by 10 includes a foam seat pad support that is constructed in accordance with the present invention and indicated generally by 12. As disclosed, the foam pad support 12 provides support for a foam cushion type seat pad on a stamped metal cushion type seat frame 14 whose rear end is connected in a suitable manner to a schematically indicated seat back 15. A plurality of elongated support members of the support 12 are fabricated from a rigid material and preferably are embodied by metal wire torsion bar springs 16. Front and rear opposite ends of the springs 16 are respectively connected to front and rear spaced portions 18 and 20 of the seat frame 14 such that the springs extend therebetween in a spaced relationship to each other in order to cooperatively provide mounting of the foam cushion pad on the seat frame. At least one strip of generally flexible tape, as illustrated by front and rear strips 22 and 24, extends laterally between the elongated torsion bar springs 16 to provide a connection therebetween in order to facilitate storage, handling, and assembly of the support 12 to the seat frame 14.

Figure 2:
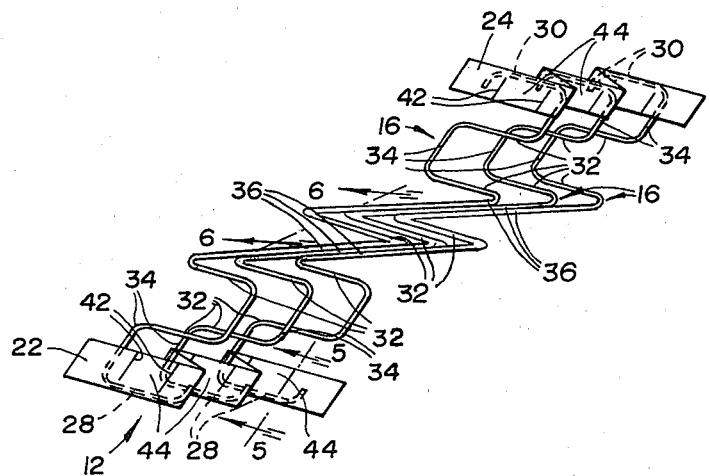
FIG. 2 is a perspective view illustrating the support for the seat pad prior to assembly to the associated seat frame.

Prior to assembly to the seat frame 14 as illustrated in FIG. 1, the foam pad support 12 can be stored in its laid out use position with the strips of tape 22 and 24 extending in a straight condition between the springs 16 or can be stored with the tape strips folded as illustrated in FIG. 2 so that the springs are in a stacked relationship. In either case, upon assembly, the endmost springs 16 can be manually grasped to position the front and rear ends of the springs respectively adjacent the front and rear seat frame portions 18 and 20 for attachment by any suitable typed of connection. If the seat pad support 12 is stored in the folded condition of FIG. 2, the assembler can initially grasp the support with a single hand and thereafter grasp the endmost springs 16 to unfold the strips of tape for positioning of the springs in the laid out use position.

As illustrated in both FIGS. 1 and 2, each of the elongated springs 16 includes front and rear end torsion bars 28 and 30 as well as intermediate torsion bars 32 which are loaded torsionally to provide the required resilient flexing that gives the seat the desired feel. Each torsion bars 28, 30, and 32 has opposite ends which are connected by spring connecting portions preferably in the form of both straight wire sections 34 extending between adjacent torsion bar ends to define U shapes and straight wire sections 36 extending between opposite torsion bar ends to define Z shapes. Each of the straight wire sections 34 and 36 has generally abrupt bends connecting the ends thereof with the associated torsion bar ends such that the springs are of the "formed wire" type as conventionally referred to in the spring industry.

The tape utilized is preferably of the pressure sensitive type whose adhesive is bonded by pressure between the tape and the spring torsion bars. Of course, the tape utilized should conform to applicable governmental regulations such as in regard to flammability.

Figure 5:
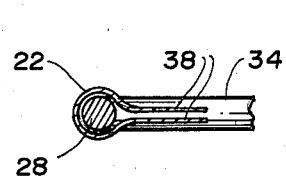
FIG. 5 is a sectional view taken along line 5—5 of FIG. 2 illustrating one folded end tape strip that secures one set of end torsion bars of the springs to each other.

As seen in FIG. 1, the front end tape strip 22 extends between the front end torsion bars 28 of the springs 16 and the rear end tape strip 24 extends between the rear end torsion bars 30 of the springs in order to provide connection of the springs to each other. Each of these end tape strips is folded, as illustrated by the front end strip 22 shown in FIG. 5, so as to extend around the associated end torsion bar such that flaps 38 thereof can be bonded to each other by squeezing of the flaps against each other to actuate the pressure sensitive adhesive of the tape which is also likewise bonded to the associated end torsion bars.

Figure 4:
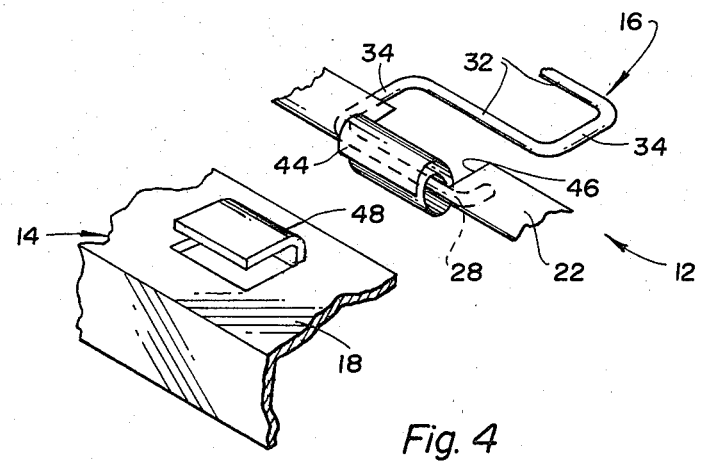
FIG. 4 is an exploded perspective view illustrating the manner in which the seat pad support is connected to the seat frame.

As seen in FIG. 2, the front and rear end tape strips 22 and 24 have pairs of cuts 42 defining tabs 44 that can each be wrapped around the associated end torsion bar 28 or 30 to provide a recess 46 as illustrated in FIG. 4. Both the front and rear torsion bars are connected to the seat frame 14 with any suitably type of connection such as the one illustrated by the front end torsion bar 28 shown in FIG. 4. After the tape tab 44 is wrapped in the manner illustrated, the front torsion bar 28 is positioned below an upwardly stamped frame tab 48 at the tape recess 46. The tab 48 can then be bent downwardly to secure the spring to the frame or, alternatively, the spacing of the front and rear frame tabs can be such that the bias of the springs maintains the end torsion bars beneath the tabs without any bending operation. In either case, the tape is interposed between the metal spring 16 and the metal seat frame 14 so as to eliminate any metal-to-metal contact and thereby eliminated noise as the spring is loaded during use.

Figure 3:
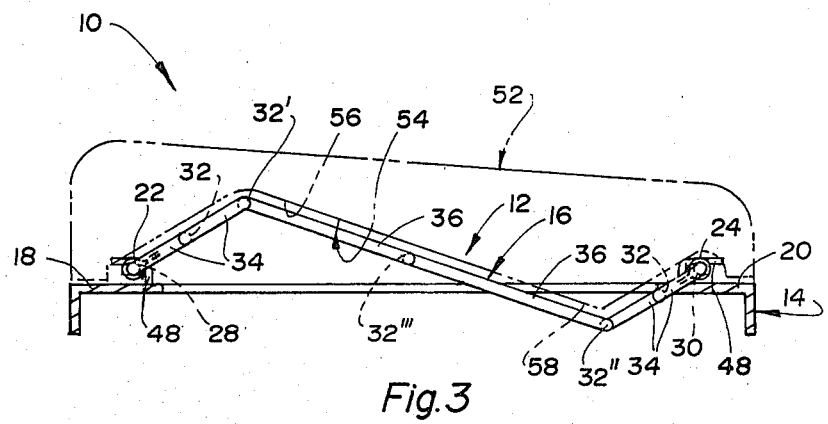
FIG. 3 is an elevation view taken in section along the direction of line 3—3 in FIG. 1 and illustrates the shape of springs of the support and the complementary varying thickness of a cushion pad supported by the springs on the seat frame.

Referring now to FIG. 3, a seat pad mounted on the support 12 is embodied by a schematically illustrated foam cushion pad 52 having a lower surface 54 which is supported by the tape connected springs 16 of the support 12. A forward intermediate torsion bar 32' of each spring 16 is positioned above the adjacent front end torsion bar 28 of the spring and is received within an upwardly extending front recess 56 defined by the lower pad surface 54 so as to permit the pad to have a somewhat thinner thickness in the front thigh support area where the loading is not particularly large. Each spring 16 also includes a rearward intermediate torsion bar 32″ positioned below the adjacent rear end torsion bar 30 such that a downwardly extending rear projection 58 of the lower pad surface 54 can be provided to give the pad a greater thickness in the rear buttock support area where a relatively greater load is applied. This preferred construction of the tape connected spring support not only facilitates assembly in the manner previously described but also allows the cushion pad 52 to be constructed with a minimum amount of foam while still providing the required resilient resistance to deflection. Between, the torsion bars 32′ and 32″, a central intermediate torsion bar 32‴ to provided to give the spring the required resilient performance.

Figure 6:
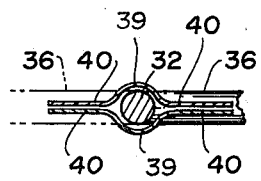
FIG. 6 illustrates an alternate embodiment and is a sectional view taken in the same direction as FIG. 5 but through an intermediate torsion bar of the spring so as to show intermediate strips of tape that connect the springs.

An alternate embodiment illustrated in FIG. 6 includes two intermediate strips 39 of the generally flexible pressure sensitive tape. These intermediate tape strips 39 extend laterally between the adjacent springs and have flaps 40 that are bonded to each other from opposite sides of the springs. The torsion bars 32 are located between tape strips 39 and are bonded by the pressure sensitive adhesive of the tape strips between the flaps 40. Such intermediate tape strips 39 can be used independently of or in cooperation with the end tape strips.

While the preferred constructions for carrying out the invention have been described in detail, those familiar with the art to which the invention relates will recognize various alternative designs and embodiments for practicing the invention as defined by the following claims.

What is claimed is:

1. A support for a seat pad comprising: a plurality of metal torsion bar springs including torsion bars with opposite ends and including connecting portions extending between the ends of the torsion bars, each spring having a pair of end torsion bars adapted to be respectively connected to spaced portions of a seat frame such that the springs extend therebetween in a spaced relationship to each other in order to permit mounting of the seat pad on the frame, each spring also having at least one intermediate torsion bar located between the end torsion bars thereof, and two strips of adhesive tape one of which is folded to connect one set of end torsion bars of the springs and the other of which is folded to connect the other set of end torsion bars of the springs to provide a connection therebetween in order to facilitate storage, handling, and assembly of the support to the seat frame.

2. A support as in claim 1 wherein each folded strip of adhesive tape includes a recess at each end torsion bar connected thereto in order to facilitate connection thereof to the seat frame.

3. A support as in claim 1 further including two additional strips of the adhesive tape connecting intermediate torsion bars of the springs and bonded to each other from opposite sides of the springs at a location intermediate the end torsion bars.

4. A support for a foam seat pad comprising: a plurality of metal torsion bar springs including torsion bars with opposite ends and including connecting portions extending between the ends of the torsion bars and connected thereto by abrupt bends; each spring having an elongated shape and including a pair of end torsion bars adapted to be connected to spaced portions of a seat frame so as to extend therebetween in a spaced relationship to each other spring in order to permit mounting of a foam seat pad on the frame; each spring also including at least one intermediate torsion bar located between the end torsion bars thereof; two strips of pressure sensitive adhesive tape extending laterally with one strip of tape associated with one set of end torsion bars of the springs and with the other strip of tape associated with the other set of end torsion bars of the springs; each strip of tape being folded and bonded to itself in order to connect the associated set of end torsion bars; the strips of tape cooperating to facilitate storage, handling, and assembly of the support to the seat frame; and each strip of tape including a recess at each end torsion bar connected thereto so as to facilitate connection thereof to the seat frame.

5. In combination with a vehicle seat including a frame having spaced front and rear portions and a foams cushion pad to be mounted thereon, a support for the foam cushion pad comprising: a plurality of metal torsion bars springs including torsion bars with opposite ends and including connecting portions extending between the ends of the torsion bars and connected thereto by abrupt bends, each spring having an elongated shape and including front and rear end torsion bars adapted to be respectively connected to the spaced front and rear portions of the seat frame so as to extend therebetween in a spaced relationship to each other spring in order to cooperatively mount the foam cushion pad on the frame; each spring also including a central intermediate torsion bar, a forward intermediate torsion bar positioned above the adjacent front end torsion bar, and a rearward intermediate torsion bar positioned below the adjacent rear end torsion bar; two strips of pressure sensitive adhesive tape extending laterally with one strip of tape associated with one set of end torsion bars of the springs and with the strip of tape associated with the other set of end torsion bars of the springs; each strip of tape being folded and bonded to itself in order to connect the associated set of end torsion bars; the strips of tape cooperating to facilitate storage, handling, and assembly of the support to the seat frame; and the foam cushion pad having a lower surface including an upwardly extending front recess and a downwardly extending rear projection respectively supported by the springs adjacent the forward and rearward intermediate torsion bars.

* * * * *

UNITED STATES PATENT AND TRADEMARK OFFICE
CERTIFICATE OF CORRECTION

PATENT NO. : 4,357,005
DATED : November 2, 1982
INVENTOR(S) : Robert P. Bourke

It is certified that error appears in the above—identified patent and that said Letters Patent is hereby corrected as shown below:

Column 4, line 60 (Specification page 10, line 5) "eliminated" should read --eliminate--.

Column 6, line 28 (Claim 5) "foams" should be --foam--.

Column 6, line 32 (Claim 5) "bars" first occurrence, should be --bar--.

Signed and Sealed this

Twenty-fourth Day of May 1983

[SEAL]

Attest:

DONALD J. QUIGG

Attesting Officer   Acting Commissioner of Patents and Trademarks